United States Patent
Cox et al.

(10) Patent No.: US 8,589,759 B2
(45) Date of Patent: Nov. 19, 2013

(54) RAM SINGLE EVENT UPSET (SEU) METHOD TO CORRECT ERRORS

(75) Inventors: Robert E. Cox, Somers, CT (US); James A. Gosse, Storrs, CT (US); Kimberly K. Sendlein, Marlborough, CT (US); David S. Harman, Simsbury, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 474 days.

(21) Appl. No.: 12/896,348

(22) Filed: Oct. 1, 2010

(65) Prior Publication Data

US 2012/0084628 A1 Apr. 5, 2012

(51) Int. Cl.
*G11C 29/00* (2006.01)
(52) U.S. Cl.
USPC .......................................... 714/763
(58) Field of Classification Search
USPC .......................................... 714/763
See application file for complete search history.

(56) References Cited

U.S. PATENT DOCUMENTS

| | | | |
|---|---|---|---|
| 5,490,155 A * | 2/1996 | Abdoo et al. | 714/763 |
| 5,574,855 A | 11/1996 | Rosich et al. | |
| 5,872,910 A | 2/1999 | Kuslak et al. | |
| 5,905,854 A | 5/1999 | Nielson et al. | |
| 6,751,756 B1 | 6/2004 | Hartnett et al. | |
| 7,401,269 B2 | 7/2008 | Hoda et al. | |
| 7,779,333 B2 * | 8/2010 | Taito et al. | 714/763 |
| 2004/0225928 A1 | 11/2004 | Miyagi | |
| 2007/0226551 A1 * | 9/2007 | Janke et al. | 714/703 |
| 2008/0148130 A1 * | 6/2008 | Eilert | 714/763 |
| 2009/0249148 A1 | 10/2009 | Ito et al. | |

OTHER PUBLICATIONS

Extended European Search Report from International Application Serial No. 111786968.4, dated Feb. 24, 2012.

\* cited by examiner

*Primary Examiner* — Albert Decady
*Assistant Examiner* — Enam Ahmed
(74) *Attorney, Agent, or Firm* — Kinney & Lange, P.A.

(57) ABSTRACT

An error detection and correction (EDAC) circuit mitigates the effect of single event upsets (SEU) events in a redundant memory system. The EDAC circuit includes a first input for receiving first data and parity information stored by a first memory device and a second input for receiving second data and parity information stored by a second memory device. First parity check logic calculates parity for the received first data and parity information. Second parity check logic calculates parity for the received second data and parity information. Bit comparison logic detects differences between the first data and the second data, and between the first parity information and the second parity information. Based on the parity check calculated for the first and second data, and the bit comparison, data select logic selects either the first data or the second data for provision to a data bus.

14 Claims, 2 Drawing Sheets

RAM SINGLE EVENT UPSET (SEU) METHOD TO CORRECT ERRORS

BACKGROUND

The present invention is related to memory systems and in particular to redundant memory systems for mitigating the effect of single event upset (SEU).

Memory systems oftentimes employ an error detection and correction (EDAC) circuit to ensure that data read from memory circuitry is correct. That is, the EDAC detects the presence of errors in the data received from the memory system and to the extent possible acts to correct the detected errors.

In aerospace applications, this problem is of particular importance. Memory devices used in aerospace applications are subject to high-energy neutrons and/or other particles that have the ability to flip or change the state of a particular memory cell in what is a called a 'single-event upset'. In the past, risks associated with SEU events were avoided by using 'hardened' memory devices resistant to these particles. Past solutions include 'hardening' of the memory devices such that they are less susceptible to SEU events. However, 'hardened' memory devices are typically much more expensive than traditional memory devices. It would therefore be beneficial if traditional memory devices could be employed while still providing the required protection from SEU events.

SUMMARY

An error detection and correction (EDAC) circuit mitigates the effect of single event upsets (SEUs) in a redundant memory system. The EDAC circuit includes a first input for receiving first data and parity information stored by a first memory device and a second input for receiving second data and parity information stored by a second memory device. A first output provides the data selected by the EDAC circuit onto a data bus. The EDAC circuit includes a first parity check logic that calculates whether parity is 'good' or 'bad' in the received first data and parity information. Second parity check logic calculates whether parity is 'good' or 'bad' in the received second data and parity information. Bit comparison logic detects differences between the first data and the second data, and between the first parity bits and the second parity bits. Based on the parity check calculated for the first and second data, and the bit comparison, data select logic selects either the first data or the second data for provision to the data bus.

DETAILED DESCRIPTION

The present invention provides a memory system that mitigates the effect of single event upsets (SEUs). In particular, the present invention employs redundant memory (e.g., first and second memory devices storing identical data) in combination with an error detection and correction (EDAC) circuit to mitigate the consequences of a SEU event. While traditional EDAC circuits attempt to correct errant data by reconstructing the original data using error correction codes, the EDAC circuit as described in greater detail herein performs correction by correctly selecting a redundant copy of the data. Storing redundant data ensures that even if an SEU event occurs on one of the memory devices, identical and presumably good data can be retrieved from the second memory. The function of the EDAC circuit is to identify when data on one or both of the redundant memories is 'bad', and select 'good' data from the other memory to propagate to other systems. In addition, the EDAC circuit is responsible for recognizing when neither of the available data is 'good'.

Figure 1:
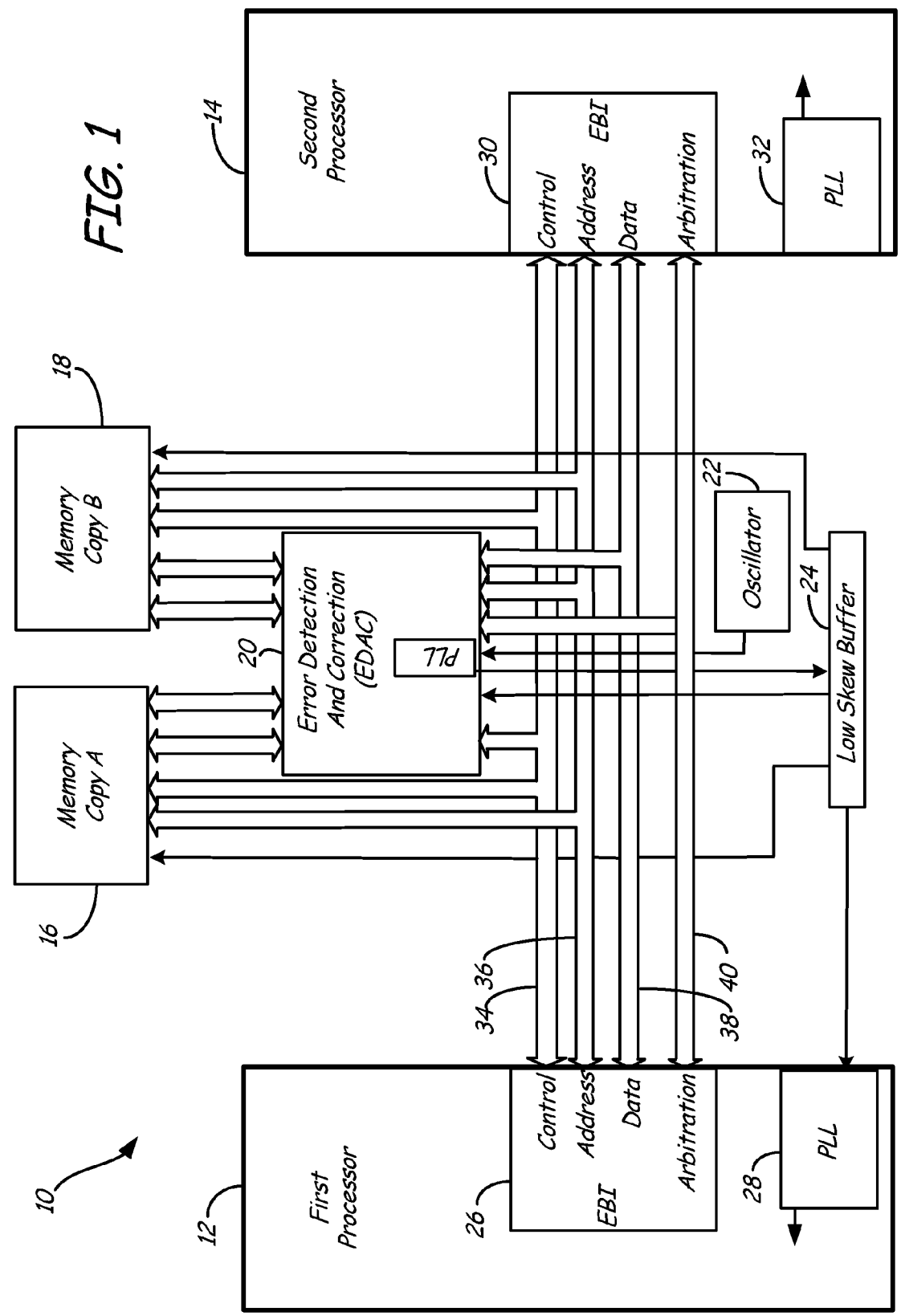
FIG. 1 is a block diagram of a memory system having an error correction and detection (EDAC) circuit for mitigating single event upsets (SEUs) according to an embodiment of the present invention.

FIG. 1 is a block diagram of a memory system having an error correction and detection (EDAC) circuit for mitigating single event upsets (SEUs) according to an embodiment of the present invention. In the embodiment shown in FIG. 1, memory system 10 is employed in an electronic engine control system for an aerospace application. The present invention may be applicable in a variety of applications, but is particularly suited for aerospace applications exposed to stray neutrons and other particles that are often associated with the presence of SEU errors.

System 10 includes first processor 12, and second processor 14, first memory 16 (i.e., memory copy A), second memory 18 (i.e., memory copy B), error detection and correction (EDAC) circuit 20, oscillator 22, and low skew buffer 24. In this embodiment, first and second processors 12 and 14 provide additional redundancy to the system, but in other embodiments a single processor (e.g., first processor 12) may be employed. First memory 16 and second memory 18 are redundant memory devices, meaning identical data is maintained in both devices. In this embodiment, memory devices 16 and 18 are static random access memory (SRAM) devices, but other types of memory devices may be employed depending on the application. In the embodiment shown in FIG. 1, EDAC circuit 20 is implemented with a field programmable gate array (FPGA) device, but in other embodiments may be implemented with a combination of various hardware and software components. Additionally, it will be understood that each of the first memory 16 and second memory 18 can include multiple memory devices, where one or more memory devices holding a first copy of data and parity information are referred to as first memory 16 or first memory device 16, and one or more memory devices holding a second copy of data and parity information are referred to as second memory 18 or second memory device 18.

First processor 12 includes external bus interface (EBI) 26 and phase lock loop (PLL) 28, with second processor 14 similarly including EBI 30 and PLL 32. EBIs 26 and 30 interface first processor 12 and second processor 14 to first memory 16, second memory 18, and EDAC circuit 20 via control bus 34, address bus 36 and data bus 38, respectively. Control bus 34 communicates control instructions from first processor 12 (or second processor 14) to components such as the redundant memories 16 and 18, and EDAC circuit 20. Control instructions may include read commands, write commands, and test commands. Address bus 36 dictates the address to be accessed within the redundant memories 16 and 18. Data bus 38 communicates data to and from the redundant memories 16, 18 and EDAC circuit 20. Arbitration bus 40 is employed in embodiments relying on dual processors to determine which processor has priority over use of the control, address and data buses 34, 36, 38. Oscillator 22 provides a clock frequency for use in system 10. Low skew buffer 24 operates in conjunction with the system clock to distribute a synchronous clock signal to first processor 12, second processor 14, memory device 16, memory device 18 and EDAC circuit 20. In this way, synchronous communication is maintained between devices in memory system 10.

The most common operations performed by memory system 10 are read/write operations. For example, to write data to memory first processor 12 (or second processor 14) places a 'write' command on control bus 34, an address identifying the location in memory data should be written to on address bus 36, and the data to be written on data bus 38. Commands/addresses/data placed on the respective buses 34, 36, 38 are communicated to both the first memory device 16 and second memory device 18. In this way, data placed on data bus 38 is written to both the first memory device 16 and second memory device 18, thereby maintaining redundant data in both devices.

To read data from memory, first processor 12 (or second processor 14) places a 'read' command on control bus 34 along with an address on address bus 36 that identifies the location in memory from which data should be read. Based on the received read command and address, the corresponding data is retrieved by both the first memory 16 and second memory 18 and communicated to EDAC circuit 20 for error detection and correction. EDAC circuit 20 checks for errors in the received data and makes a determination regarding which data to provide onto data bus 38 for readout by the respective processor. Operations performed by EDAC circuit 20 include identifying whether data from first memory 16 or second memory 18 have errors, what data is to be provided onto data bus 38, or whether the data is uncorrectable such that the system should be reset and default data should be provided onto data bus 38.

Figure 2:
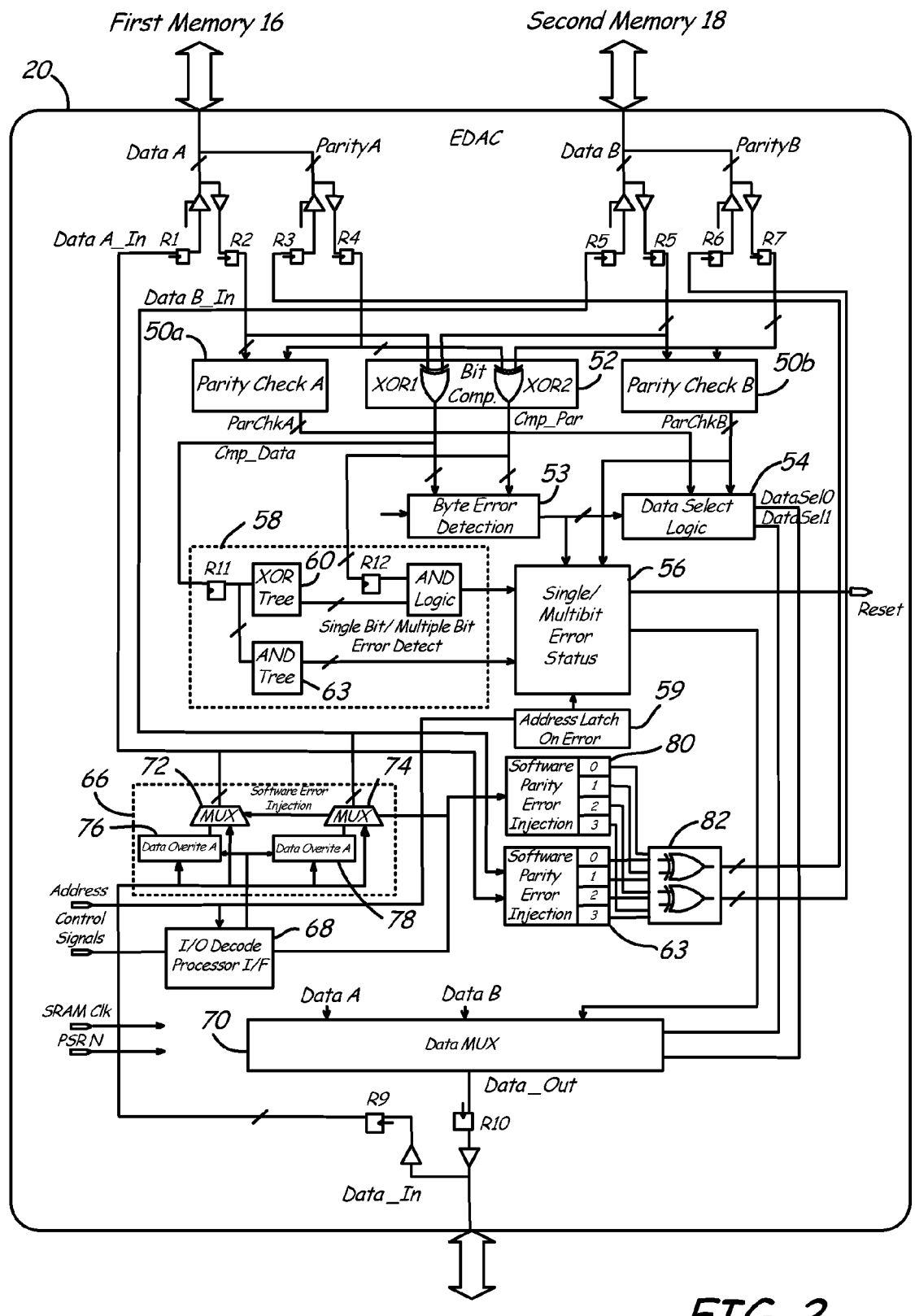
FIG. 2 is a logic/block diagram illustrating operations performed by the EDAC according to an embodiment of the present invention.

FIG. 2 is a logic/block diagram illustrating operations performed by EDAC circuit 20 according to an embodiment of the present invention. In the embodiment shown in FIG. 2, EDAC circuit 20 encodes data (e.g., adding parity) used to identify errors during readback, determines whether the errors are correctable, selects data for output onto data bus 38, and determines when it is necessary to reset the memory system shown in FIG. 1, including resetting of first processor 12, second processor 14, first memory 16, second memory 18, and EDAC circuit 20). EDAC circuit 20 includes interfaces for bi-directional communication with first memory device 16, second memory device 18, and data bus 38. EDAC circuit 20 further includes a plurality of registers R1-R12 for capturing inputs and outputs provided to and from EDAC circuit 20, as well as for capturing internal data checks and comparisons within EDAC circuit 20. The use of registers R1-R12 allows EDAC circuit 20 to pipeline the error detection and correction process. For example, register R9 is used to latch data received from data bus 38 for subsequent provision to multiplexers 72 and 74, and parity generator 62. The data is subsequently latched along with generated parity bits by registers R1, R3, R5, and R7 for provision to the respective memory devices 16, 18. Similarly, data and parity bits read from the memory devices 16 and 18 are latched by registers R2, R4, R6, and R8, respectively. Additional registers R11 and R12 are employed within EDAC circuit 20 for storing the results of various comparisons and calculations associated with the error detection and correction functionality.

During write operations EDAC circuit 20 operates to encode data received from data bus 38 with error correction bits that are subsequently used during read operations to determine whether the data is 'good' or 'bad'. In the example provided in FIG. 2, EDAC circuit 20 employs parity generator 62 for appending parity bits to the received data. For each set of data bits, a parity bit is added to make the number of zeros or ones in the data either an even or an odd number. The parity bits are stored along with the data bits, and during readback the parity bits can be used to determine whether the data is 'good' or 'bad'. In the embodiment shown in FIG. 2, each data word is comprised of thirty-two bits divided into four 8-bit bytes. A parity bit is generated with respect to each 8-bit byte, resulting in four parity bits being associated with each thirty-two bit data word. The use of parity bits may result in simplified logic, reduced gate count, and increased throughput as compared to the use of more elaborate error correction codes or cyclic redundancy checks that can require more complex logic and/or additional clock cycles to complete.

During data read operations, data and parity bits stored by first memory 16 (data A and parity A) and second memory 18 (data B and parity B) are pipelined through EDAC circuit 20. EDAC circuit 20 compares the data bits from both memories to one another to detect the number of bits that are different, checks the parity associated with each data word, and based on the results determines which copy of the data to use or whether neither copy of the data should be employed. The following table illustrates the behavior of EDAC circuit 20 as illustrated in FIG. 2 according to an embodiment of the present invention. In particular, the column 'Data Compare Output' is a function of a comparison of data bits from first memory 16 and second memory 18 that indicates the number of bits that are different between the respective data. The column 'Parity Compare Output' is a function of a comparison of parity A and parity B bits, with the output 'yes' indicating that no difference exists between the compared bits and 'no' indicating that a difference does exist between the parity bits. Cross-checking parity A bits and parity B bits provides increased error detection and accommodation coverage for faults in the check data in addition to handling errors in the data itself. The column 'Parity Check A Output' indicates the result of a parity check performed on the data word from first memory 16 based on the parity data from first memory 16. The column 'Copy to Use' indicates the memory from which data should be selected, and the column 'Reset' indicates whether neither set of data is 'good' such that the system 10 is reset.

TABLE 1

| Row | Case | Data Compare Output | Parity Compare Output | Parity Check A Output | Parity Check B Output | Copy to Use | Reset |
|---|---|---|---|---|---|---|---|
| 1 | Normal - No Error | 0 | Yes | OK | OK | A | No |
| 2 | Single Bit Error in Parity B | 0 | No | OK Odd Parity | Bad Even Parity | A | No |
| 3 | Single Bit Error in Parity A | 0 | No | Bad Even Parity | OK Odd Parity | B | No |
| 4 | Single Bit Error on B | 1 | Yes | OK Odd Parity | Bad Even Parity | A | No |
| 5 | Single Bit Error on A | 1 | Yes | Bad Even Parity | OK Odd Parity | B | No |
| 6 | Multi-Bit Error | 0 | Yes | Bad Even Parity | Bad Even Parity | Default* | Yes |
| 7 | Multi Bit Error | 1 | No | Don't Care | Don't Care | Default* | Yes |
| 8 | Multi Bit Error | 2-8 | Don't Care | Don't Care | Don't Care | Default* | Yes |

*Default could be either data

As a default, if no errors exist in the data or the parity bits (row 1) then data A is selected to be provided to data bus 38.

If there is a difference in the compared parity bits (but not in the compared data bits), indicating an error in either parity A bits or parity B bits, then EDAC circuit 20 selects data corresponding to whichever parity check comes out 'good' (rows 2, 3). That is, if the parity check for copy A is 'bad', then the error in the parity bits was likely in the parity A bits and therefore data B is provided to data bus 38. If there is a single-bit error in either data A or data B as indicated by the data compare output (but the parity compare indicates no errors), then EDAC circuit 20 selects data based on which parity check indicates good parity (rows 4, 5). If neither the data comparison nor the parity comparison indicates any differences between the data provided by first memory 16 and second memory 18, but both parity checks are 'bad', this indicates a multiple-bit error between the data words, and neither copy of data is selected (row 6). In this instance, a reset signal is generated that indicates the system should be reset. In the event a single bit error is detected between data A and data B, as well as a difference between the parity bits, EDAC circuit 20 cannot determine which data copy is good and so default data is selected (row 7). Once again, a reset signal is generated indicating that the system should be reset. If a multiple bit error is detected between data A and data B, then EDAC circuit 20 selects default data and resets the system (row 8).

The block diagram in FIG. 2 illustrates logic employed to achieve the desired behavior, along with additional built-in test operations used to ensure EDAC circuit 20 is operating correctly. Parity checker 50a receives the data word (labeled 'DataA') and parity bits (labeled 'ParityA') and performs a parity check to determine whether the parity is 'good'. In this way, parity checker 50a detects situations in which a single bit in the data is incorrect. In this embodiment, parity checker 50a checks the parity with respect to each 8-bit word and associated parity bit. In other embodiments, additional parity bits may be employed to improve the detection of errors. However, situations in which either multiple-bit errors exist in the data word or single-bit errors exist in the parity bits, then the output of parity checker 50a will not correctly identify whether the data is 'good' or 'bad'. The output provided by parity checker 50a (labeled ParChkA) is a four-bit output, with each bit corresponding to one of the four bytes associated with each data word. For example, if parity checker 50a determines that the parity of the data word is 'good', then the output ParChkA would indicate that all bytes within the data word is good (e.g., '0000'). If parity checker 50a determines that the parity of the first byte of the data word is 'bad', then the output would indicate an error in the first byte (e.g., '1000'). The output of parity checker 50a is supplied to data select logic 54.

Parity checker 50b performs the same function as that performed by parity checker 50a, but performs the parity check on data received from second memory device (e.g., data word labeled 'DataB'). The output of parity checker 50b (labeled 'ParChkB') is supplied to single/multibit error status logic 56 and data select logic 54. As described with respect to parity checker 50a, single bit errors are detected by parity checker 50b, but multi-bit errors (within an individual byte of the data word) and errors within the parity bits are not detected.

Bit compare logic 52 acts to compare the data word and parity bits from first memory device 16 to the data word and parity bits from second memory device 18. In this way, differences between individual bits can be detected. In particular, logic gate XOR1 compares data A from first memory 16 to data B from second memory 18 and generates an output (labeled 'Cmp_data') that identifies differences between the respective data words. If no errors exist, the data words stored in first memory 16 and second memory 18 are identical (i.e., redundant). If there are differences between the data words, those are indicated on a bit-by-bit basis in the bit compare output 'Cmp_data' provided to byte error detection logic 53 and single bit/multiple bit error detect logic 58. Logic gate XOR2 similarly compares parity bits from first memory 16 to parity bits from second memory 18 and generates an output (labeled 'Cmp_par') that identifies differences between the respective parity bits. The outputs provided by bit compare logic 52 are provided to both byte error detection logic 53 and to single bit/multiple bit error detection logic 58.

Byte error detection logic 53 detects errors within the compared data and parity bits and provides an output indicating the bytes that contain errors to data select logic 54. Based on the received inputs, data select logic 54 selects either data A or data B. In one embodiment, in the event data select logic 54 determines that neither set of data is good, data A is nonetheless selected as a default. To select a particular copy of the data to be used, data select logic 54 provides a data select signal (e.g., DataSel0, DataSel1) to data multiplexer 70. Based on the received data select signal, data multiplexer 70 provides at its output the selected data (labeled 'Data_Out'). The selected data is registered by latch R10 and provided onto data bus 38 for readout by the processor.

Byte error detection logic 53 cannot determine which copy of data or parity bits holds the error, only that a discrepancy exists between the compared bits. Based on the error output provided by byte error detection logic 53 and parity check data provided by parity checkers 50a and 50b, data select logic 54 selects the data word to provide onto data bus 38. For example, if no data errors or parity errors (i.e., discrepancies) are detected by byte error detection logic 53, then data select logic 54 selects by default data A provided by first memory 16 (Table 1, row 1). If errors are detected in the parity bits, but not in the data bits, then data select logic 54 selects data A if the parity check associated with data A is 'good' (row 2). Otherwise data select logic 54 selects data B (row 3). If errors are detected in the data word, but not in the parity bits, then data select logic 54 selects the data A if the parity check associated with data A is 'good' (row 5). Otherwise data select logic 54 selects data B (row 6). If errors are detected in both the data bits and the parity bits, then data select logic 54 is unable to determine which copy of data is 'good', and therefore selects default data (e.g., invalid data A with a system reset, see row 7). Finally, if multiple bit errors are detected within the data word, then no information is valid and the EDAC circuit issues a system reset (row 8).

In addition, single bit/multiple bit error detect logic 58 includes XOR logic tree 60, AND logic tree 63, and AND logic tree 64 for determining whether a single or multiple bit error exists. The result of the data bit comparison provided by XOR1 is provided as an input to XOR logic tree 60 and AND logic tree 63. In addition, the result of the parity bit compare provided by XOR2 and the output of XOR logic tree 60 are combined by AND logic 64 to detect the presence of single bit/multiple bit errors that extend to the parity bits as well. In response, single bit/multiple bit error detect logic 58 provides an indication to single/multibit error status logic 56 that determines whether, in the presence of multiple bit errors, the system 10 needs to be reset via the 'Reset' command. In the event of a reset, the memory devices 16, 18 may be rewritten, erased, or powered down and copied over with new data. In response to a detected single bit/multi-bit error, the address at which the error occurred (as provided by address bus 36) is latched by address latch on error logic 58 and provided as an input to single/multi-bit error status logic 56. The location of the detected error is provided by single/multi-bit error status logic 56 as part of the EDAC status output provided to data multiplexer 70, and in turn provided onto data bus 38 for communication to the processor.

In addition, the embodiment shown in FIG. 2 provides built-in test of EDAC circuit 20. Software error injection logic 66 and software parity error injection logic 80 act to inject or insert errors into data stored by memory devices 16 and 18. During subsequent readout, the response by EDAC circuit 20 can be monitored to ensure the injected errors are properly identified and handled. In the embodiment shown in FIG. 2, software error injection logic 66 includes data A overwrite module 76, data B overwrite module 78, and multiplexers 72 and 74. Data provided by data bus 38 as part of a write operation is provided to data overwrite modules 76 and 78, and multiplexers 72 and 74. During normal operation, the data stored in data overwrite modules 76 and 78 are ignored, and the correct data is selected via multiplexers 72 and 74 for communication to memory devices 16 and 18, respectively. During test operations multiplexers 72 and 74 are configured to select data from data overwrite modules 76 and 78, respectively, for communication to memory devices 16 and 18, respectively. Data overwrite modules 76 and 78 can be controlled via control signals received from I/O decode processor interface 68 to modify the stored data, allowing software error injection module 66 to inject errors into the stored data (e.g., inject errors in one copy of the data to test the bit comparison function) before stored to memory devices 16 and 18.

Similarly, software parity error injection logic 80 allows errors to be injected into the parity bits prior to storage to memory devices 16 and 18. Software parity error injection module 80 likewise receives commands from I/O decode processor interface 68. In response, errors are selectively injected into one of the four bit positions for each data word. The injected error is combined by XOR logic 82 with the normally generated parity bits provided by parity generator 62 to generate the desired parity bits with injected errors for storage to memory devices 16 and 18.

In this way, the present invention provides a system and method for detecting and correcting errors in a redundant memory system. While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. An error detection and correction (EDAC) circuit for use in a redundant memory system, the EDAC circuit comprising:
    a first input for receiving first data and parity information stored by a first memory device;
    a second input for receiving second data and parity information stored by a second memory device, wherein the second data and parity information stored by the second memory device mirrors the first data and parity information stored by the first memory device;
    a first output for providing either the first data or the second data onto a data bus;
    first parity check logic that calculates whether parity is 'good' or 'bad' in the received first data and parity information;
    second parity check logic that calculates whether parity is 'good' or 'bad' in the received second data and parity information;
    bit comparison logic that detects differences between the first data and the second data, and between the first parity information and the second parity information; and
    data select logic that selects either the first data or the second data for supplying to the first output based on the calculated parity of the first data and the second data and the differences between the first data and the second data, and between the first parity information and the second parity information.

2. The EDAC circuit of claim 1, further including:
    single bit/multiple bit error detect logic that detects the presence of multiple bit errors in the first and second data and parity information based on the detected differences between the first data and the second data, and between the first parity information and the second parity information; and single/multibit error logic that resets the memory system in response to detected multiple bit errors.

3. The EDAC circuit of claim 2, wherein the behavior of the EDAC circuit is defined by the following table:

| Case | Data Compare Output | Parity Compare Output | Parity Check A Output | Parity Check B Output | Copy to Use | Reset |
|---|---|---|---|---|---|---|
| Normal - No Error | 0 | Yes | OK | OK | A | No |
| Single Bit Error in Parity B | 0 | No | OK Odd Parity | Bad Even Parity | A | No |
| Single Bit Error in Parity A | 0 | No | Bad Even Parity | OK Odd Parity | B | No |
| Single Bit Error on B | 0 | Yes | OK Odd Parity | Bad Even Parity | A | No |
| Single Bit Error on A | 1 | Yes | Bad Even Parity | OK Odd Parity | B | No |
| Multi-Bit Error | 0 | Yes | Bad Even Parity | Bad Even Parity | Neither | Yes |
| Multi Bit Error | 1 | No | Don't Care | Don't Care | Neither | Yes |
| Multi Bit Error | 2-8 | Don't Care | Don't Care | Don't Care | Neither | Yes | wherein the data compare output represents the output of the bit comparison logic in comparing the first data to the second data, the parity compare output represents the output of the bit comparison logic in comparing the first parity information to the second parity information, parity check A represents the output of the first parity check logic that calculates whether parity is 'good' or 'bad' with respect to the first data, parity check B represents the output of the second parity check logic that calculates whether parity is 'good' or 'bad' with respect to the second data, copy to use represents the output provided by the data select logic in selecting the data provided to the data bus, and reset represents the output of the single/multibit error status logic in determining whether to reset the first and second memory devices.

4. The EDAC circuit of claim 1, further including:
    built-in test logic for selectively injecting errors into the first and second parity information provided to the first and second memories, respectively.

5. The EDAC circuit of claim 4, wherein the built-in test logic selectively injects errors into the first and second data provided to the first and second memories, respectively.

6. A method of reducing single event upset (SEU) errors in memory systems with an error detection and correction (EDAC) circuit, the method comprising:
retrieving first data and parity information from a first memory device;
retrieving second data and parity information from a second memory device, wherein the second data is redundant to the first data retrieved from the first memory device;
calculating whether the parity of the first data is 'good' or 'bad' based on the retrieved first data and parity information;
calculating whether the parity of the second data is 'good' or 'bad' based on the retrieved second data and parity information;
detecting differences between the first data the second data, and between the first parity information and the second parity information; and
selecting either the first data or the second data for supplying to a data bus based on the calculated parity of the first data and the second data and the differences between the first data and the second data, and between the first parity information and the second parity information.

7. The method of claim 6, further including:
detecting the presence of multiple bits errors in the first and second data and parity information based on the detected differences between the first data and the second data, and between the first parity information and the second parity information; and
resetting the memory system in response to detected multiple bit errors.

8. The method of claim 6, further including:
operating the EDAC circuit in a test mode in which errors are deliberately injected into the parity information associated with the first and second data; and
checking the output of EDAC circuit to determine whether the injected errors were correctly identified during readout by the EDAC circuit.

9. The method of claim 6, further including
operating the EDAC circuit in a test mode in which errors are deliberately injected into the first and second data; and
checking the output of EDAC circuit to determine whether the injected errors were correctly identified during readout by the EDAC circuit.

10. A redundant memory system comprising:
a first memory device for storing first data and parity information;
a second memory device for storing second data and parity information redundant to the first data and parity information; and
an error detection and correction (EDAC) circuit that during write operations encodes parity information in data being written to the first memory device and the second memory device and during read operations determines whether to select data from the first memory device or the second memory device to provide onto a data bus, the EDAC circuit comprising:
first parity check logic that calculates whether parity is 'good' or 'bad' in the received first data and parity information;
second parity check logic that calculates whether parity is 'good' or 'bad' in the received second data and parity information;
bit comparison logic that detects differences between the first data and parity information and the second data and parity information; and
data select logic that selects either the first data or the second data for supplying to the data bus based on the calculated parity of the first data and the second data and the differences between the first data and the second data, and between the first parity information and the second parity information.

11. The redundant memory system of claim 10, the EDAC circuit further including: single bit/multiple bit error detect logic that detects the presence of multiple bit errors in the first and second data and parity information based on the detected differences between the first data and the second data, and between the first parity information and the second parity information; and single/multibit error logic that resets the memory system in response to detected multiple bit errors.

12. The redundant memory system of claim 10, the EDAC circuit further including:
built-in test logic for selectively injecting errors into the first and second parity information provided to the first and second memories, respectively.

13. The redundant memory system of claim 12, wherein the built-in test logic selectively injects errors into the first and second data provided to the first and second memories, respectively.

14. The redundant memory system of claim 9, wherein the first and second memory devices are single event susceptible (SEU) devices.

* * * * *